United States Patent [19]

Sutherland et al.

[11] Patent Number: 5,461,008
[45] Date of Patent: Oct. 24, 1995

[54] METHOD OF PREVENTING ALUMINUM BOND PAD CORROSION DURING DICING OF INTEGRATED CIRCUIT WAFERS

[75] Inventors: Richard M. Sutherland, Kokomo;
Howard E. Harrell, both of Kokomo;
Wayne A. Sozansky, Greentown;
George C. Wolf, Kokomo, all of Ind.

[73] Assignee: Delco Electronics Corporatinon, Kokomo, Ind.

[21] Appl. No.: 249,815

[22] Filed: May 26, 1994

[51] Int. Cl.$^6$ .......... H01L 21/302; H01L 21/304; H01L 21/463

[52] U.S. Cl. .......................................... 437/226

[58] Field of Search .............................. 437/226, 227

[56] References Cited

U.S. PATENT DOCUMENTS

| | | | |
|---|---|---|---|
| 4,183,781 | 1/1980 | Eldridge et al. | 156/643 |
| 4,343,662 | 8/1982 | Gay | 148/187 |
| 4,451,972 | 6/1984 | Batinovich | 27/583 |
| 4,510,672 | 4/1985 | Yakura | 29/574 |
| 4,900,363 | 2/1990 | Brehm et al. | 134/3 |
| 5,362,681 | 11/1994 | Roberts, Jr. et al. | 437/226 |

FOREIGN PATENT DOCUMENTS

| | | | |
|---|---|---|---|
| 56-126938 | 5/1981 | Japan | H01L 21/78 |
| 56-126937 | 5/1981 | Japan | H01L 21/78 |
| 3-227556 | 8/1991 | Japan | H01L 21/78 |
| 5335412 | 12/1993 | Japan | H01L 21/78 |

OTHER PUBLICATIONS

Mayumi, S., "Corrision–Induced Contact Failures in Double–Level Al–Si–Cu Metallization", J. Elect. Soc.
Schwartz, G. C., "Reactive Ion Etching Introduces Corrosion or Al and Al–Cu Films", J. Appl. Phys., Apr. 1981.
S. Mayumi, et al., "Corrision–Induced Contact Failures in Double–Level Al–Si–Cu Metallization", *Journal of the Electrochemical Society*, v 137, n 6, pp. 1861–1867, (Jun. 1990).
Wen–Yaung Lee, "Reactive Ion Etching Induced Corrision of Al and Al–Cu Films", *Journal of Applied Physics*, v 52, n 4, pp. 2994–2999, (Apr. 1981).

*Primary Examiner*—R. Bruce Breneman
*Assistant Examiner*—Matthew Whipple
*Attorney, Agent, or Firm*—Jimmy L. Funke

[57] ABSTRACT

A method of suppressing adherence of silicon particles to IC bond pads, and corrosion thereof, during the dicing of silicon wafers by sawing. An anion of an organic acid is added to saw coolant water.

8 Claims, 1 Drawing Sheet

METHOD OF PREVENTING ALUMINUM BOND PAD CORROSION DURING DICING OF INTEGRATED CIRCUIT WAFERS

FIELD OF THE INVENTION

This invention relates to the sawing of a silicon wafer into individual integrated circuit chips. It more specifically relates to improvements in the sawing of such wafers.

BACKGROUND OF THE INVENTION

An integrated circuit chip, or die, is ordinarily formed as part of a much larger body, referred to as a wafer, and then released from the wafer by sawing. More specifically, many integrated circuit patterns are simultaneously defined or formed in a single wafer. The integrated circuit patterns are arranged in rows and columns, with the periphery of each pattern being rectangular. After the integrated circuits are fully defined, the wafer is sawed along lines between the rows and columns, which is also parallel to the edges of the patterns. By sawing completely through the wafer on those lines, the wafer is cut up into a plurality of chips, or dice. Such sawing of the wafer into individual chips or dies is referred to as dicing because the dies are also referred to as dice.

When dicing by sawing, the saw is ordinarily a rotating blade. As the saw blade rotates against the silicon wafer, it abrades the silicon away, creating colloidally small silicon particles.

The cutting area and the rotating blade are ordinarily bathed in a significant flow of deionized water. One would think that the silicon residue would be flushed away by the water coolant that floods the cutting area. Unfortunately, even under significant flooding, the small silicon particles are not completely flushed away. They adhere to the bond pads of the integrated circuit chips, leaving a silicon particle debris or residue thereon, which adversely affects the bond pads. This moist environment and the adhesion of the silicon particles is known to cause deleterious corrosion and abrasion effects. The deleterious corrosion is due, at least in part, to galvanic action of segregated copper in the aluminum alloy of the bond pad. The deleterious abrasion occurs when one scrubs the surface of the chips to remove the silicon particles from the bond pads. In some applications, these effects can be tolerated. In others, it cannot.

In the past, attempts have been made to avoid formation of the silicon residue, and its associated corrosion and/or abrasion effects. Several approaches were used. They included oxygen baking or oxygen plasma treating the wafer before sawing, or exposing the wafer to nitric acid before sawing. We have not been able to successfully use any of these treatments. In addition, they add an additional step to wafer processing prior to sawing. Another way to reduce the silicon residue effect is to mechanically scrub the wafer surface after sawing. This obviously adds an extra processing step after sawing, which is objectionable. However, there is another objection. The silicon particles are relatively hard. During the mechanical scrubbing, the silicon particles can scratch the chip bond pads. The scratched bond pads can be a cause of scrap.

On the other hand, we have found a simple solution to this problem that does not entail prior or post added processing steps. Our solution is a method that is readily integrated into existing processes and equipment.

OBJECTS AND SUMMARY OF THE INVENTION

It is therefore an object of this invention to provide an improvement in the sawing of silicon wafers.

It is a more specific object of this invention to saw silicon wafers in a manner that inhibits silicon residue from adhering to aluminum bond pads.

The objects of the invention are attained by adding an organic acid to the water used to flood the saw/wafer cutting area. In a preferred embodiment, the organic acid is citric acid, added in sufficient proportion to the water coolant to lower the pH of the water coolant to less than about pH 5.5.

Other objects features and advantages of the invention will become more apparent from the Drawing and from the following description of preferred embodiments.

DESCRIPTION OF THE PREFERRED EMBODIMENTS

Figure 1:
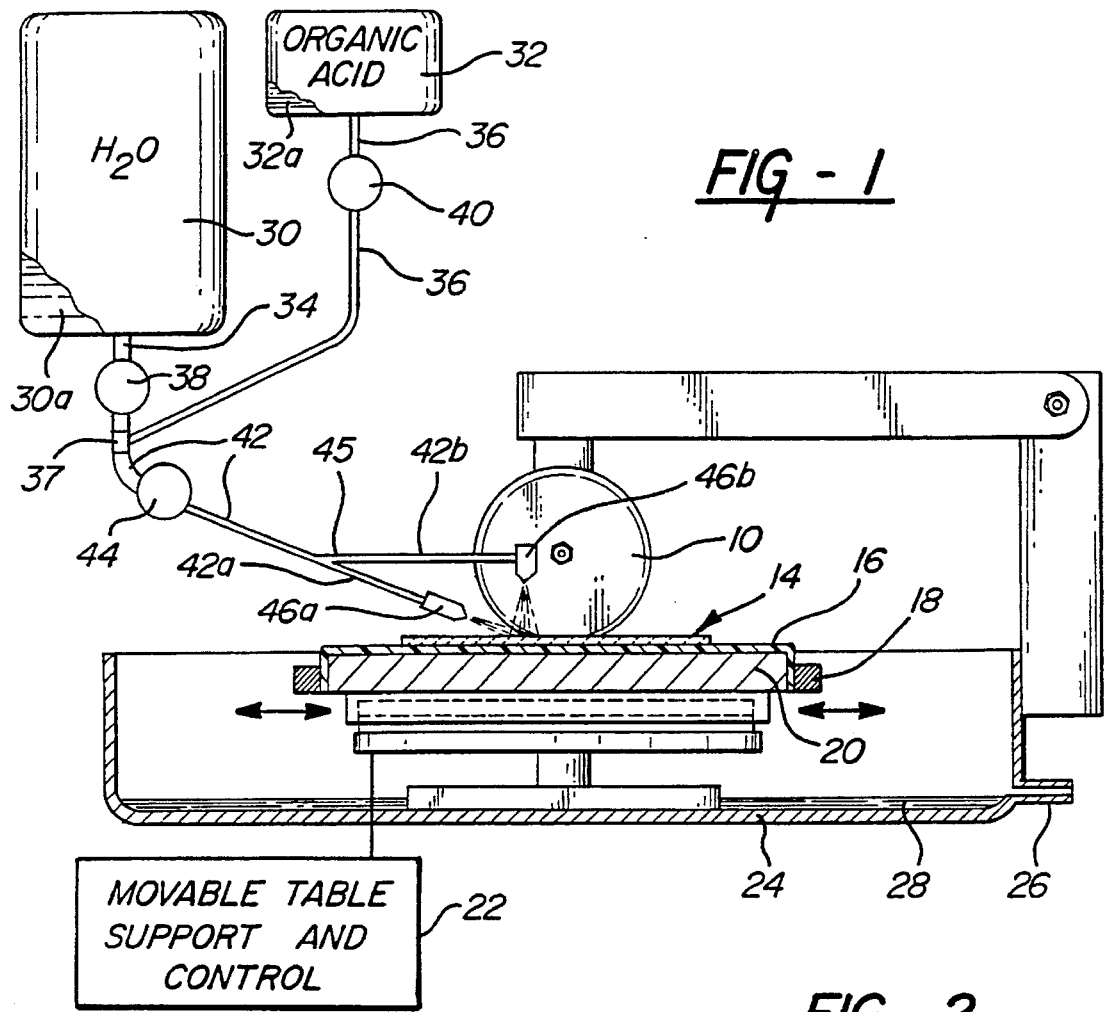
FIG. 1 shows a schematic of a typical wafer sawing apparatus, with its coolant source modified in accordance with this invention.

Actual relative sizes and shapes are not shown in the Drawing, in order to better illustrate what is involved in this invention. For example, the saw blade thickness and the chip length and width would be smaller than shown. Analogously, wafer and saw blade diameter would be larger than shown. Also, a separate reservoir of organic acid is shown to emphasize that this invention involves adding an anion of an organic acid to the normal water coolant supplied to the saw blade and cutting area. In practice, one may choose to simply dissolve an organic acid in the regular water coolant reservoir of a given saw apparatus.

As can be seen in FIG. 1, a typical wafer sawing apparatus includes a saw blade 10 affixed to a rotatable shaft 12. The shaft 12 is connected to a motor, pulley wheel or the like (which is not shown).

Saw blade 10 is shown engaging a round thin silicon wafer 14 that is adhesively affixed to the upper surface of a circular plastic membrane 16. The circular plastic membrane 16 is, in turn, supported by a surrounding metal ring 18. The silicon wafer has a diameter of about 3–8 inches and a thickness of the order of about 0.02 inch. The diameter of the plastic membrane 16 is somewhat greater than that of the wafer 14. The thickness of membrane 16 is of the order of about 0.002–0.005 inch. Accordingly, the thickness of wafer 14 and membrane 16 is exaggerated in the Drawing for purposes of illustration.

Metal ring 18 is located on circular moveable table 20 that is disposed within a surrounding tray 24. Tray 24 has an outlet drain 26 in a side wall. Accordingly liquid coolant 28 in the bottom of tray 24 does not build up above the height of drain 26.

A reservoir 30 for the deionized water 30a is shown at the top of FIG. 1. Also shown at the top of FIG. 1, is a reservoir 32 of a source 32a of organic acid anions. In a preferred embodiment, source 32a is a concentrated aqueous solution of citric acid. Fluid line 34 extends down from the bottom of reservoir 30 to a first junction point 37. Fluid line 36 extends down from the bottom of reservoir 32 to the first junction point 37. The fluid lines 34 and 36 each have an in-line control valve, 38 and 40 respectively. Valves 38 and 40 control the rate of flow of fluids through feed lines 34 and 36 from tanks 30 and 32, respectively, to the junction point 37.

A fluid line 42 extends from the first junction point 37 towards the saw blade 10. Fluid line 42 has an in-line control valve 44. At a second junction point 45, fluid line 42 divides into the three fluid lines 42a, 42b and 42c. Fluid line segments 42a, 42b, and 42c are respectively connected to nozzles 46a, 46b, and 46c. Nozzle 46a sprays liquid coolant from a position radially aligned with the saw blade 10. Nozzles 46b and 46c are disposed on opposite sides of the saw blade 10. Each of nozzles 46a, 46b and 46c spray coolant liquid 28 into the cutting area of the saw blade 10. As can be seen, the coolant liquid 28 is a mixture of liquids 30a and 32a.

The composition and force of the spray of coolant liquid 28 discharged from nozzles 46a, 46b and 46c is controlled by the in-line valves 38, 40 and 44 these valves can each include on/off functions as well.

It should also be mentioned that the reservoirs of the fluids 30a and 32a are disposed above saw blade 10, which indicates a gravity feed of the contents of reservoirs 30 and 32. On the other hand, either or both of reservoirs 30 and 32 can be pressurized. In such instance, the pressurized reservoir can be disposed at any level above or below the level of tray 24.

Further, this invention shows the source of the organic acid anions as being disposed in its own separate reservoir and then blended in with the deionized water 30a enroute to the saw blade 10. This provides ultimate variability in adjusting the concentration of organic acid anions in the coolant fluid 28 ejected from nozzles 46a, 46b and 46c. In the alternative, it is recognized that the organic acid could be dissolved directly in the coolant 30a in reservoir 30. Such premixing may be preferred, as it eliminates an added reservoir. In addition, if premixed, it raises the possibility of cleaning and recycling the used coolant liquid collected in tray 24. However, at the present time we see no benefit in attempting to reclaim the collected coolant liquid. As indicated above, the organic acid most preferred in this invention is citric acid. It is relatively inexpensive, and environmentally friendly. Accordingly, recycling of the coolant 28 is not considered to be practical or necessary at this time.

It should be mentioned that the source of the organic acid anion can be added to the coolant water in many ways. It is not considered that this invention should be limited to any one of them. As mentioned above, the organic acid can be mixed with the coolant water in the supply line, or added to the reservoir of coolant water. It should also be mentioned that some of the organic acids and salts useful in this invention are solids. If the solid is readily soluble in water, the solid could be mechanically metered into the coolant water reservoir 30 and mixed there, rather than being metered into a stream in the supply line 34 or 42. Further, if the organic acid is a solid and is not soluble in water, it can be dissolved first in some that is miscible with water, such as an alcohol. Then the resulting solution can be mixed with the coolant water in the reservoir or the supply line, as might be most practical.

Figure 2:
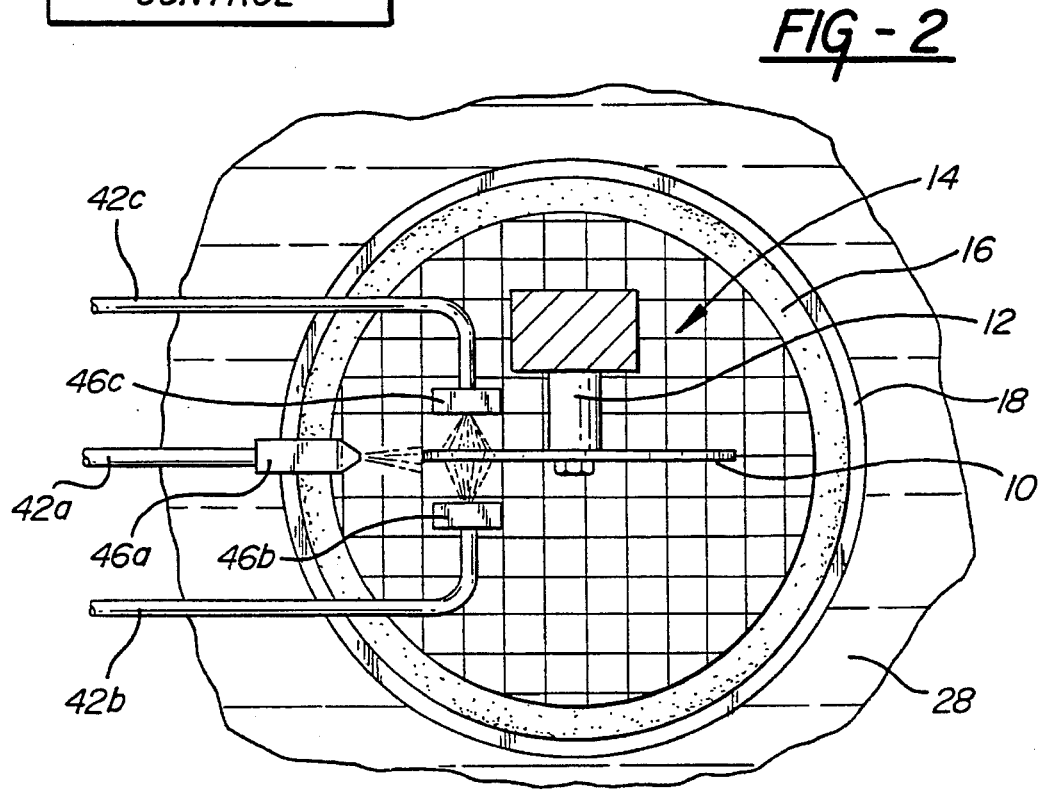
FIG. 2 shows an enlarged fragmentary top view of the saw blade/wafer area of the apparatus shown in FIG. 1.

During the sawing of a silicon wafer, the integrated circuits defined therein are disposed on the upper face of the wafer. The integrated circuit patterns are schematically presented in FIG. 2 as the open rectangular areas between the orthogonal grid lines shown on the upper face of wafer 14. The integrated circuit patterns are usually covered with a glass or silicon nitride coating except at the metallized bond pads (not shown). The bond pads are normally disposed along the edges of each individual integrated circuit pattern area, but not necessarily so.

As indicated above, the sawing operation generates extremely fine silicon particles. We have noted that many of these particles are of colloidal size, i.e., about 1 micron and less. The silicon particles are so fine that they deposit on the surface of the bond pads during the sawing operation and are not rinsed off under the force of the coolant spray coming from nozzles 46a, 46b and 46c. We believe that the silicon particles are so fine that they acquire a charge and strongly adhere to the exposed surface the metallized bond pads.

The bond pads are normally of aluminum or an aluminum alloy. The aluminum alloy can be, by weight, 98% aluminum, 1% silicon and 1% copper. We have recognized that heat treatments of the wafer prior to sawing can cause some segregation of copper in this alloy. This can produce sites in the exposed bond pad that have a different galvanic potential than adjacent sites in the exposed bond pad. Such differences can cause galvanic corrosion of the exposed bond pad when it is exposed to a humid environment, and particularly a moist environment. As indicated above, the sawing operation provides a very moist environment. Accordingly we note that there is inherently a tendency for galvanic erosion during sawing. We believe that the presence of the small silicon particles on the bond pads can enhance galvanic corrosion of the copper containing aluminum alloy of the bond pads during the sawing operation and/or later. Distinctive corrosion pits are formed that have a silicon residue ringing each etched pit. We refer to this distinctive appearance as a "freckle". The presence of such freckles on a completed chip may not be objectionable in some applications. On the other hand the presence of such freckles in other applications is considered to be a defect upon which completed chips are rejected. Accordingly in such applications, the presence of freckles on bond pads decreases yield of acceptable chips, resulting in higher manufacturing costs.

If the freckles are objectionable, one can scrub the integrated circuit chip immediately after sawing, to remove the silicon residue. This inhibits any further corrosion effects due to the silicon particles. However, as indicated above, the scrubbing action can scratch the outer surface of the bond pads, since silicon is a relatively hard particle. In addition, the sawing is usually done to dice the wafer into individual IC chips. One wants the individual IC chips to remain adhered to the supporting membrane 16. In scrubbing the chips to remove the silicon residue, one runs the risk of dislodging a chip from the membrane and/or moving it on the membrane.

As indicated above, the silicon residue adheres to the aluminum bond pads on the chip but essentially not to the inorganic insulating coating that covers the balance of the chip. In the past, it was believed that one could reduce the tendency of the silicon residue to adhere to the aluminum bond pads if they were given a thin oxide coating before sawing. As indicated above, treatments such as oxygen baking, oxygen plasma treatments after etching, and treatment with nitric acid have been used. However, they did not prove to be particularly useful or were objectionable in some respect. Accordingly, they have not been used in regular production.

In this invention, one inhibits deposition of the silicon particles on the bond pads without need for any extra processing step. Only a simple modification of existing procedures is needed. This modification is the addition of the anion of an organic acid to the deionized water coolant normally used during the sawing operation.

We believe that the anion of the organic acid is the active agent in this invention. We believe the organic acid anion complexes on the bond pad surface to suppress corrosion. It probably complexes with the aluminum but could also be complexing with copper and/or silicon. Secondly, we believe the organic acid anion that inhibits the adherence of silicon particles to the metal bond pads. By anion we mean the negatively charged ion resulting from ionization of an organic acid or from ionization of a salt of an organic acid. For example, the citrate ion would be the active agent in this invention for an aqueous solution of citric acid or of sodium citrate. Other organic acid anions appear to work too. They include the succinate ion, the acetate ion and the oxalate ion. Still others appear to work, as hereinafter described. As indicated above, we believe that the organic acid anion passivates the bond pads and/or electrically affects the silicon particles. It can passivate by complexing with the aluminum of the bond pad. It can electrically affect the colloidal silicon particles by changing their ionic potential. In the latter instance, by changing the ionic potential of the silicon particles, they are no longer attracted to the aluminum surface and/or their charge is not great enough to break through the passivation which the anion provides on the aluminum surface. In any event, these mechanisms can work together to inhibit the colloidal silicon particles from sticking to the aluminum bonding pad surfaces of the individual IC chips. This inhibition inherently also inhibits bond pad corrosion and scratching of the bond pads caused by the silicon particles.

The minimum concentration of the organic acid anion needed to experience a benefit, seems to vary with the organic acid anion. In general, it appears that concentrations above about 0.001 Molar (M) of most organic acid anions will destroy the colloidal suspension. With such concentrations of most organic acid anions, the silicon particles will not adhere to the aluminum, and will precipitate out of the coolant solution. On the other hand, a concentration of only about 0.00005M of some organic acid anions appear to be useful, as hereinafter described. Accordingly, the minimum concentration of the organic acid anion needed to observe a benefit will vary. However, we prefer to use stronger concentrations than the minimum needed to observe an effect.

A number of different organic acids were tested, and their effectiveness observed. For example, the organic acid or salt was progressively added to a water slurry resulting from a silicon wafer sawing operation. Such a saw water slurry had the fine particles of silicon dispersed therein, as indicated above. The progressive addition of the organic acid or salt progressively increased the concentration of the organic acid anion in the slurry. The molar concentration, by molarity (M), needed to cause precipitation of the silicon particles was noted. With additions of citric acid or potassium citrate, precipitation was first observed when the citrate anion concentration was raised to about 0.005 Molar (M). With succinic acid additions, precipitation was first observed at about 0.015M. With disodium succinate additions, precipitation was first observed when the succinate concentration was raised to about 0.007M. With each of malic acid, formic acid and acetic acid, a concentration of about 0.001M was required to produce silicon particle precipitation. On the other hand, a concentration of only about 0.0002M was needed for malonic acid to precipitate the silicon particles. Analogously, a concentration of only about 0.0005M of oxalic acid or fumaric acid was needed to precipitate the silicon particles. A three acid mixture, by weight, of succinic acid (26%), glutaric acid (48%), and adipic acid (26%) was also tested. At a mixture concentration of about 0.003M, precipitation of the silicon colloidal particles was observed. This latter test indicated that the organic acids could be used in combination as well as independently. It should be also be observed that some of the tests referred to above show that salts of the organic acids are also effective in this invention.

As indicated in the preceding paragraph, salts of the organic acids also are effective in preventing adhesion of the colloidal particles to the aluminum bonding pads. Even though effective, they may be objectionable on other grounds. The application of added metal ions, i.e., cations, to the IC chip surface may be considered objectionable, especially sodium ions. Accordingly, we prefer to use the acid itself, rather than the salt of the acid. It should also be recognized that an organic ester is a reaction product of an organic acid and an alcohol. Esters can hydrolyze in water, to release the precursor organic acid anion and alcohol. The degree of hydrolysis of course depends on the ester composition and other factors. It is to be understood that, if desired, an organic ester could be used as the source of the organic acid anion. It is not expected that this latter source of the organic acid anion would be a preferred technique. However, it could be used. Moreover, the presence of the alcohol in the coolant might have some ancillary benefit, as for example in reducing surface tension.

It should also be mentioned that when the organic acid is used as the source of the acid anion, pH of the water coolant is lowered. When citric acid is used as the organic acid in the water coolant, we have found that a pH of about 3.5–5.5 can be useful, preferably a pH of about 4.0. On the other hand it should be recognized that pH alone is not believed to be the mechanism by which adherence of the silicon particles to the aluminum bond pads is inhibited.

The foregoing detailed description shows that the preferred embodiments of the present invention are well suited to fulfill the objects above stated. It also shows that those skilled in the art may make various modifications or additions to the preferred embodiments chosen to illustrate the present invention, without departing from the spirit and proper scope of the invention. For example, still other organic acids, salts, and/or esters, or other sources of the organic acid anion than those named herein, may be found to be useful in inhibiting adhesion to aluminum of the colloidal silicon particles found in the saw slurry. Accordingly it is to be understood that the protection sought and to be afforded hereby should be deemed to extend to the subject matter defined by the appended Claims, including all fair equivalents thereof.

We claim:

1. In a method of sawing an area of a silicon wafer having exposed metallization areas while applying water to said area, which method produces small silicon particles that can adhere to the exposed metallic areas on said silicon wafer, the improvement in which the water is deionized and contains an anion of an organic acid in a concentration that provides a hydronium ion concentration of a pH that is less than about 5.5, and which organic acid anion concentration is effective in inhibiting adherence of said particles to said exposed metallic areas and which is also effective in inhibiting galvanic corrosion of aluminum alloys exposed on said wafer during said sawing.

2. The method as defined in claim 1 wherein the organic acid anion results from at least one member selected from the class consisting of organic acids, salts of organic acids, and esters.

3. The method as defined in claim 2 wherein the organic acid anion is polycarboxylic.

4. The method as defined in claim 3 wherein the organic acid is citric acid anion and the pH of the solution is about 3.5–5.5.

5. The method as defined in claim 3 wherein said anion is an anion of at least one organic acid selected from the group consisting of citric acid, succinic acid, glutaric, adipic, malic acid, malonic acid, oxalic acid, and fumaric acid.

6. The method as defined in claim 4 wherein said anion is an anion of at least one organic acid selected from the group consisting of citric acid, succinic acid, glutaric, adipic, malic acid, malonic acid, oxalic acid, and fumaric acid.

7. The method as defined in claim 1 wherein the organic acid anion produces a hydronium ion concentration of a pH of about 3.5–5.5.

8. The method as defined in claim 1 wherein the organic acid anion is polycarboxylic.

\* \* \* \* \*